United States Patent
Vedsted et al.

(10) Patent No.: US 9,538,769 B2
(45) Date of Patent: Jan. 10, 2017

(54) SYSTEM AND METHOD FOR PEELING AND DEVEINING SHRIMP

(71) Applicant: Laitram, L.L.C., Harahan, LA (US)

(72) Inventors: Lars Vedsted, Vadum (DK); Bruce F. Taylor, Kenner, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/987,267

(22) Filed: Jan. 4, 2016

(65) Prior Publication Data

US 2016/0192666 A1 Jul. 7, 2016

Related U.S. Application Data

(60) Provisional application No. 62/100,127, filed on Jan. 6, 2015.

(51) Int. Cl.
*A22C 29/02* (2006.01)

(52) U.S. Cl.
CPC .......... *A22C 29/022* (2013.01); *A22C 29/026* (2013.01); *A22C 29/028* (2013.01)

(58) Field of Classification Search
CPC .... A22C 29/022; A22C 29/024; A22C 29/026
USPC ..................................... 452/1–5, 8
See application file for complete search history.

(56) References Cited

U.S. PATENT DOCUMENTS

| 2,778,055 | A | | 1/1957 | Lapeyre et al. | |
| 4,251,902 | A | * | 2/1981 | Grinberg | A22C 29/026 452/15 |
| 4,816,276 | A | | 3/1989 | Blazevich | |
| 5,195,921 | A | * | 3/1993 | Ledet | A22C 29/028 452/2 |
| 5,259,809 | A | * | 11/1993 | Rainey, Jr. | A01K 69/06 119/213 |
| 5,290,199 | A | * | 3/1994 | Morris | A22C 29/022 452/3 |
| 5,569,065 | A | * | 10/1996 | Sawyer | A22C 29/022 452/3 |
| 6,200,209 | B1 | | 3/2001 | Shelton | |
| 6,273,807 | B1 | | 8/2001 | Shelton | |
| 7,467,992 | B2 | * | 12/2008 | Sawyer | A22C 29/026 452/3 |
| 7,867,067 | B2 | * | 1/2011 | Dancy | A22C 29/026 452/5 |
| 8,079,896 | B1 | | 12/2011 | Sawyer | |
| 8,616,940 | B2 | * | 12/2013 | Vedsted | A22B 5/166 452/5 |

(Continued)

FOREIGN PATENT DOCUMENTS

CN 104222250 A 12/2014

OTHER PUBLICATIONS

International Search Report and Written Opinion of the International Searching Authority, PCT/US2016/012061, mailed Apr. 18, 2016, Korean Intellectual Property Office, Daejeon, Republic of Korea.

*Primary Examiner* — Richard Price, Jr.
(74) *Attorney, Agent, or Firm* — James T. Cronvich

(57) ABSTRACT

System and method for processing raw shrimp. A head-on shell-on shrimp is first back-slit to expose the vein. Next, the head and some or all of the vein is removed in a hydraulic deheader. The headless, back-slit shrimp is then peeled in a roller-type peeling machine to remove the shell and any residual vein and provide high-quality, peeled and deveined shrimp meat.

4 Claims, 3 Drawing Sheets

(56) References Cited

U.S. PATENT DOCUMENTS 8,801,507 B2 * 8/2014 Vedsted ............... A22C 29/028
452/4

* cited by examiner

SYSTEM AND METHOD FOR PEELING AND DEVEINING SHRIMP

BACKGROUND

The invention relates generally to systems and methods for processing shrimp. More particularly, it relates to peeling and deveining shrimp.

Shrimp are commonly machine-peeled in bulk on roller-type peelers and then deveined manually or by machine. But complete deveining of peeled shrimp in bulk without noticeable scoring or shredding of the shrimp meat is difficult.

SUMMARY

One method embodying features of the invention for processing a raw shrimp comprises: (a) cutting a slit in the back of a raw, head-on shrimp through the shell to expose the vein to produce a head-on, back-slit shrimp; (b) subjecting the head-on, back-slit shrimp to a turbulent flow of water to remove the head and at least some of the vein from the head-on, back-slit shrimp to produce a headless shrimp with residual shell; and (c) removing residual shell and vein from the headless shrimp in a roller-type peeler.

In another aspect, one version of a shrimp-processing system embodying features of the invention comprises a back cutter cutting a slit in the back of a raw, head-on shrimp; a hydraulic deheader receiving the raw, head-on shrimp and subjecting it to a turbulent flow of water to remove the head and at least some of the vein from the head-on, back-slit shrimp to produce a headless shrimp with residual shell; and a roller-type peeler receiving the headless shrimp and peeling residual shell and vein from the headless shrimp.

DETAILED DESCRIPTION

Figure 1:
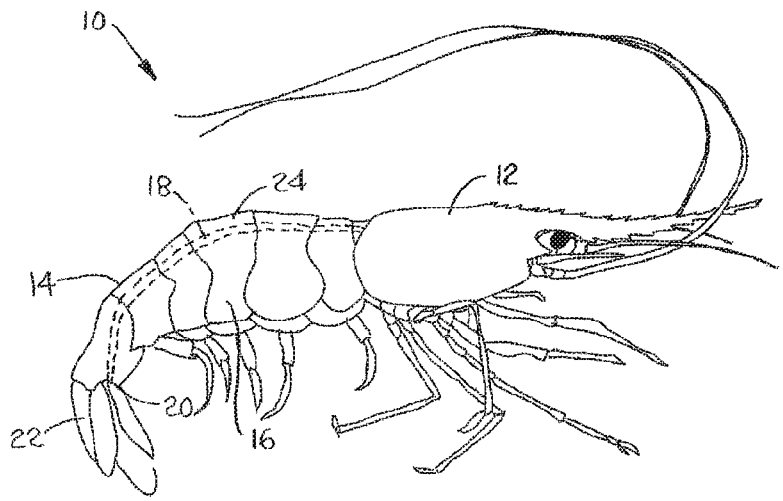
FIG. 1 is a side view of a shrimp.

FIG. 1 shows a raw shrimp 10 having a head 12 and a shell 14 covering shrimp meat 16. An intestine 18, commonly called a vein, extends from inside the head 12 to a vent 20 at the tail 22. The vein runs along the back of the shrimp 10 just under a thin layer 24 of back meat. Because the vein 18 is usually filled with unsightly dark and often gritty material, its removal is desirable.

Figure 2:
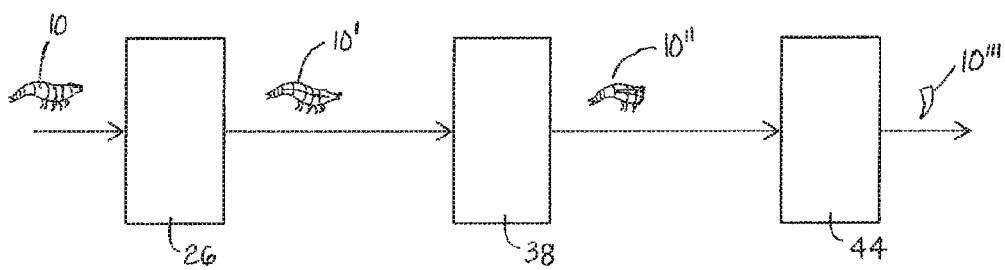
FIG. 2 is a block diagram of a shrimp-processing system embodying features of the invention.
Figure 3:
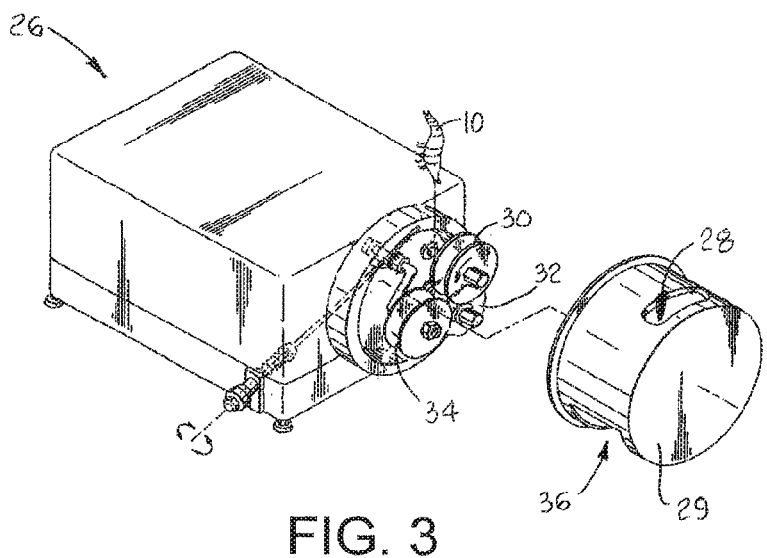
FIG. 3 is an isometric view of a back-cutting machine usable in a shrimp-processing system as in FIG. 2.

FIG. 2 shows a block diagram of a shrimp-processing system embodying features of the invention. A raw head-on, shell-on shrimp 10 is properly oriented and fed into a back-cutting machine 26, such as that shown in FIG. 3. Alternatively, back-cutting can be a completely manual operation. One example of such a back-cutting machine is described in U.S. Pat. No. 5,569,065, "Shrimp Deveining Machine Having Precision Cutting Control," Oct. 29, 1996, assigned to Prawnto Shrimp Machine Company of Texas, Inc. of Caddo Mills, Tex., U.S.A. The disclosure of that patent is incorporated into this description by reference. The head-on shrimp 10 is fed into the machine 26 through an opening 28 in a protective shield 29 covering the cutting region. A pair of motor-driven upper flexible disks 30 draw the shrimp 10 into the machine and drive the shrimp past a cutting disk 32. The cutting disk 32 is rotated at a greater speed than the upper disks 30 to make a clean cut in the back of the shrimp through the shell. The cutting disk 32 is positioned to cut deeply enough to slit the back shell and expose the vein. Free-wheeling lower disks 34 hold the shrimp against the cutting disk 32 and direct a back-slit shrimp 10' out of a lower exit opening 36 in the shield 29.

Figure 4:
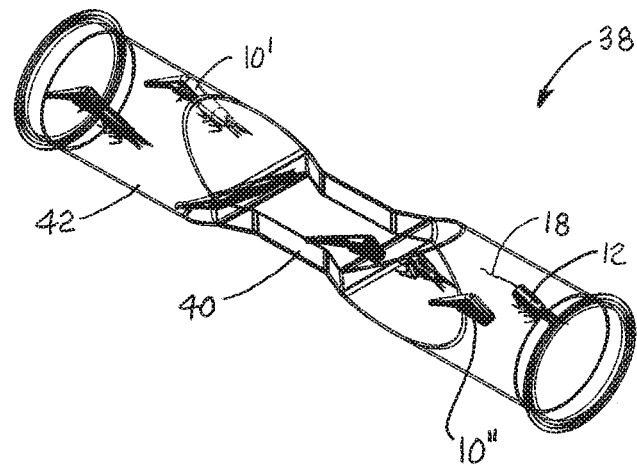
FIG. 4 is an isometric view of a hydraulic deheader usable in a shrimp-processing system as in FIG. 2.
Figure 5:
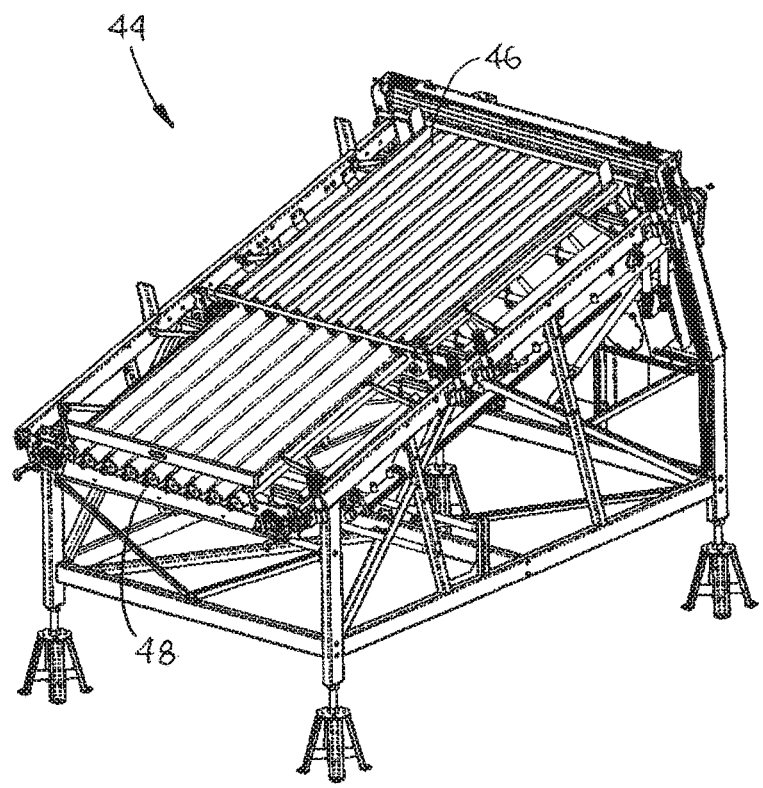
FIG. 5 is an isometric view of a roller-type peeler usable in a shrimp-processing system as in FIG. 2.

As shown in FIG. 2, the back-slit shrimp 10' is then processed in a hydraulic shrimp deheader 38, such as that shown in FIG. 4. Examples of hydraulic deheaders that operate using the Venturi effect are disclosed in U.S. Pat. No. 5,195,921, "Apparatus for Deheading and Cleansing Shrimp," Mar. 23, 1993, to Ledet and U.S. Pat. No. 8,801,507, "Shrimp Deheading Apparatus and Methods," Aug. 12, 2014, to Vedsted et al. The disclosure of both those patents is incorporated into this description by reference. The back-slit, head-on shrimp 10' enters the hydraulic deheader 38 along with other such shrimp. A venturi-effect restrictor 40, or venturi, for short, is formed in the deheader 38 by restricting the cross section of the deheader's fluid channel 42. The increase in flow velocity caused by the restriction creates turbulent flow that separates the heads from the remaining shrimp body. The exposed vein of the back-slit shrimp is largely removed along with the head owing to the vein's attachment at one end to the head. Separated heads 12 and veins 18 exit the deheader 38 along with headless, shell-on shrimp 10" with back slits and possibly some residual vein.

The headless shrimp 10" are then fed, in bulk, to a roller-type peeling machine 44, such as a LAITRAM® Model A peeler manufactured and sold by Laitram Machinery, Inc. of Harahan, La., U.S.A. A similar roller-type peeler is described in U.S. Pat. No. 2,778,055, "Machine for Peeling Shrimp," Jan. 22, 1957, to Lapeyre et al. The disclosure of that patent is incorporated into this description by reference. The peeler 44 removes the shells and any residual heads, swimmerets, and veins by subjecting the shrimp to peeling nips between counter-rotating rollers 46. Peeled, deveined shrimp meats 10''' exit the bottom end 48 of the peeler 44 for further processing downstream.

Figure 6:
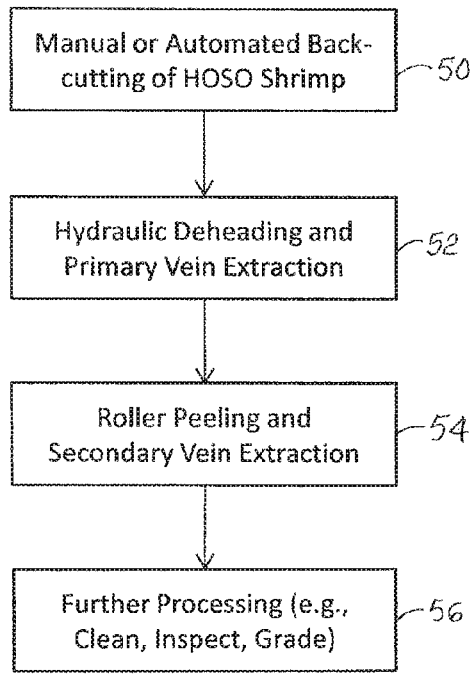
FIG. 6 is a flowchart of a method for processing shrimp using a shrimp-processing system as in FIG. 2.

A flowchart of the process is provided in FIG. 6. A method for processing shrimp that embodies features of the invention starts with a back cutter manually back-slitting shrimp, such as with a scissors or knife, or semi-automatically back-slitting shrimp, such as by hand-feeding shrimp into a back-cutting machine (FIG. 3), to cut a slit in the back of a raw, head-on shrimp to expose the vein as in block 50. Then the back-slit shrimp's head and vein are extracted in a hydraulic deheader as in block 52. The deheader provides primary vein extraction that removes most of the vein. The headless shrimp is next peeled in a roller-type peeler as in block 54, which separates any residual shell, heads, swimmerets, and vein from the shrimp to provide headless peeled shrimp ready for further processing such as cleaning, grading, and inspection as in block 56. Thus, according to this method, back-cutting head-on shrimp followed by hydraulic deheading before peeling produces high-quality, deveined and peeled shrimp meats.

Figure 7:
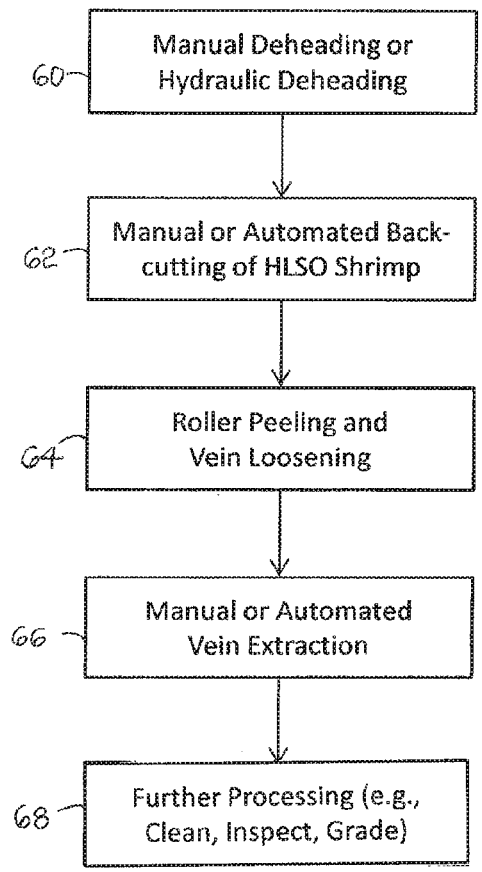
FIG. 7 is a flowchart of another method for processing shrimp.

Another method for processing shrimp is shown in the flowchart of FIG. 7. First, head-on, shell-on shrimp are manually, mechanically, or hydraulically deheaded as in block 60. Then the backs of the deheaded shrimp are manually, automatically, or semi-automatically slit to expose the veins as in block 62. Next, the back-slit shrimp are peeled in a peeling machine to separate shells and to loosen the veins from the shrimp meat, as in block 64. Remaining veins are then extracted manually or by machine as in block 66. The deveined and peeled shrimp meats are then ready for further processing, as in block 68.

What is claimed is:

1. A method for processing a raw shrimp, comprising:
    cutting a slit in the back of a raw, head-on shrimp through the shell only deep enough to expose the vein to produce a head-on, back-slit shrimp;
    subjecting the head-on, back-slit shrimp to a turbulent flow of water to remove the head and at least some of the vein from the head-on, back-slit shrimp to produce a headless shrimp with residual shell;
    removing residual shell and vein from the headless shrimp in a roller-type peeler.

2. The method of claim 1 wherein the head-on, back-slit shrimp is subjected to the turbulent flow in a venturi-effect restricted channel.

3. A shrimp-processing system comprising:
    a back cutter cutting a slit in the back of a raw, head-on shrimp only deep enough to expose the vein;
    a hydraulic deheader receiving the raw, head-on shrimp and subjecting it to a turbulent flow of water to remove the head and at least some of the vein from the head-on, back-slit shrimp to produce a headless shrimp with residual shell;
    a roller-type peeler receiving the headless shrimp and peeling residual shell and vein from the headless shrimp.

4. A shrimp-processing system as in claim 3 wherein the hydraulic deheader includes a venturi-effect restrictor.

\* \* \* \* \*